United States Patent
Kamata

(10) Patent No.: US 6,577,652 B1
(45) Date of Patent: Jun. 10, 2003

(54) OPTICAL ADD-DROP MULTIPLEXER OF WDM OPTICAL SIGNALS

(75) Inventor: Hisashi Kamata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/327,885

(22) Filed: Jun. 8, 1999

(30) Foreign Application Priority Data

Jun. 12, 1998 (JP) .......................... 10-179810

(51) Int. Cl.$^7$ ................................. H04J 14/02
(52) U.S. Cl. .................... 370/535; 370/534; 359/116
(58) Field of Search ................................. 370/403, 404, 370/405, 406, 534, 535, 541; 359/115, 116, 124, 333, 337.2, 339, 341.41, 341.42

(56) References Cited

U.S. PATENT DOCUMENTS

| | | | | |
|---|---|---|---|---|
| 5,940,197 A | * | 8/1999 | Ryu | 359/152 |
| 6,229,641 B1 | * | 5/2001 | Kosaka | 359/337 |
| 6,288,836 B1 | * | 9/2001 | Kawasaki et al. | 359/341.42 |
| 6,339,495 B1 | * | 1/2002 | Cowle et al. | 359/341.4 |
| 6,414,769 B1 | * | 7/2002 | Meli et al. | 359/124 |

FOREIGN PATENT DOCUMENTS

| | | | |
|---|---|---|---|
| JP | 7-30520 | 1/1995 | |
| JP | 9-36834 | 2/1997 | |
| JP | 9-102991 | 4/1997 | |
| JP | 9-224016 | 8/1997 | |
| JP | 10-104461 | 4/1998 | |
| JP | 10-142046 | 5/1998 | |
| JP | 10-150433 | 6/1998 | |
| JP | 11-331093 | 11/1999 | |
| WO | WO98/05133 | * 2/1998 | H04B/10/213 |

OTHER PUBLICATIONS

Japanese Office Action issued Aug. 29, 2000 in a related application with English translation of relevant portions.

* cited by examiner

Primary Examiner—Steven Nguyen
Assistant Examiner—Duc Duong
(74) Attorney, Agent, or Firm—Dickstein, Shapiro, Morin & Oshinsky, LLP.

(57) ABSTRACT

To provide an OADM (Optical Add-Drop Multiplexer) convenient or organizing an NB-WDM optical communication system, wherein the number and the wavelengths of the optical signals to be dropped and added can be controlled optionally and optical intensity of each wavelength component can be leveled automatically at an appropriate level, the OADM comprises: an optical demultiplexer (2) for demultiplexing WDM optical signals into optical signals to be outputted to optical paths, respectively; an output-signal leveling unit (8) for automatically controlling optical intensity of optical signals inputted through the optical paths, respectively; optical switches (3-1 to 3-n) inserted in the optical paths, respectively, each of the optical switches dropping a first optical signal inputted from the optical demultiplexer (2) and connecting a second optical signal to the output-signal leveling unit (8) when driven in an add/drop mode, and passing the first optical signal to the output-signal leveling unit when driven in a through mode; and an optical multiplexer (11) for multiplexing the optical signals outputted from the output-signal leveling unit (8) into the WDM optical signals to be outputted.

6 Claims, 3 Drawing Sheets

OPTICAL ADD-DROP MULTIPLEXER OF WDM OPTICAL SIGNALS

BACKGROUND OF THE INVENTION

The present invention relates to an NB-WDM (Narrow Band Wavelength Division Multiplex) optical communication system, and particularly to an optical add-drop multiplexer (hereinafter abbreviated as OADM) to be employed in an in-line station of the NB-WDM optical communication system for adding or dropping optical signals of desired wavelengths among WDM optical signals transmitted in the system.

In order to transmit WDM optical signals for a long distance without quality degradation, it is important that optical intensity of every wavelength component of the WDM optical signal is maintained to be equal with each other at an appropriate level. In Japanese patent application No. 10-142046 filed by the applicant of present application on May 11, 1998 an entitled "A WDM optical signal leveling circuit," there is a proposed an optical amplifier circuit to be used as a repeater node of a point-to-point NB-WDM optical communication system for amplifying and leveling optical intensity of every wavelength component at an appropriate level.

FIG. 3 illustrates an example of a point-to-point NB-WDM optical communication system, wherein optical amplifiers 16-1 to 16-m are inserted for repeatedly amplifying WDM optical signals to be transmitted from a transmitter terminal station 17 to a receiver terminal station 21.

The optical amplifier circuit as above mentioned is preferable to be employed as the optical amplifiers 16-1 to 16-m of such a point-to-point NB-WDM optical communication system. For organizing a flexible trunk network making use of the NB-WDM optical communication system, however, it is preferable that each node of the trunk network may be composed of an OADM which can drop or add optical signals of desired wavelengths from/to the WDM optical signals, for connecting the trunk network with local networks such as a SONET (Synchronous Optical NETwork), for example.

As to the OADM, there is a prior art apparatus disclosed in a Japanese patent application entitled "An Optical Add-Drop Multiplexer" and laid open as a Provisional Publication No. 10-104461.

According to this prior art, WDM optical signals having n different wavelengths $\lambda_1$ to $\lambda_n$ (n being a positive integer) are amplified all together by way of an EDFA (Erbium-Doped optical-Fiber Amplifier) and separated into n optical signals making use of n different optical-fiber gratings. Then, each (except one, for example) of the n optical signals is attenuated respectively through a variable attenuator to have an appropriate signal level, and multiplexed again into WDM optical signals by way of a 1×n star coupler. The one having a wavelength $\lambda_j$, for example, of the n optical signals is dropped and supplied to a SONET and another optical signal from the SONET is connected to the 1×n star coupler after its wavelength is converted into $\lambda_i$ to be added into the WDM optical signals in place of the dropped signal.

However, in the prior art apparatus, the attenuation coefficient of each variable attenuator is determined initially according to the network design and no automatic level control is provided. This means lack of adaptability against change of operational condition. Furthermore, the number and the wavelengths of optical signals, or channels, to be dropped and added at each OADM are fixed in the prior art apparatus. This means lack of flexibility to variation of bandwidths to be assigned to local networks respectively, without saying of flexibility to the network configuration and its change of the trunk network.

SUMMARY OF THE INVENTION

Therefore, a primary object of the present invention is to resolve above problems and provide an OADM convenient for organizing an NB-WDM optical communication system, wherein the number and the wavelengths of the optical signals to be dropped and added can be controlled optionally and optical intensity of each wavelength component can be leveled automatically at an appropriate level.

In order to achieve the object, an OADM of the invention, of WDM signals having a plurality of wavelength components, comprises:

an optical demultiplexer for demultiplexing the WDM optical signals inputted to the optical demultiplexer into optical signals, each of the optical signals having respective one of the wavelength components and being outputted to respective one of optical paths;

an output-signal leveling unit for automatically controlling optical intensity of optical signals inputted through the optical paths, respectively;

at least one optical switches inserted in certain of the optical paths, respectively, each of the optical switches dropping a first optical signal inputted from the optical demultiplexer and connecting a second optical signal to the output-signal leveling unit when driven in an add/drop mode, and passing the first optical signal to the output-signal leveling unit when driven in a through mode; and an optical multiplexer for multiplexing the optical signals outputted from the output-signal leveling unit into the WDM optical signals to be outputted.

Therefore, desired wavelength components of the WDM optical signals can be dropped and added by driving respective certain of the optical switches in the add/drop mode, and optical intensity of every wavelength component of the WDM optical signals can be leveled automatically at an appropriate level.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
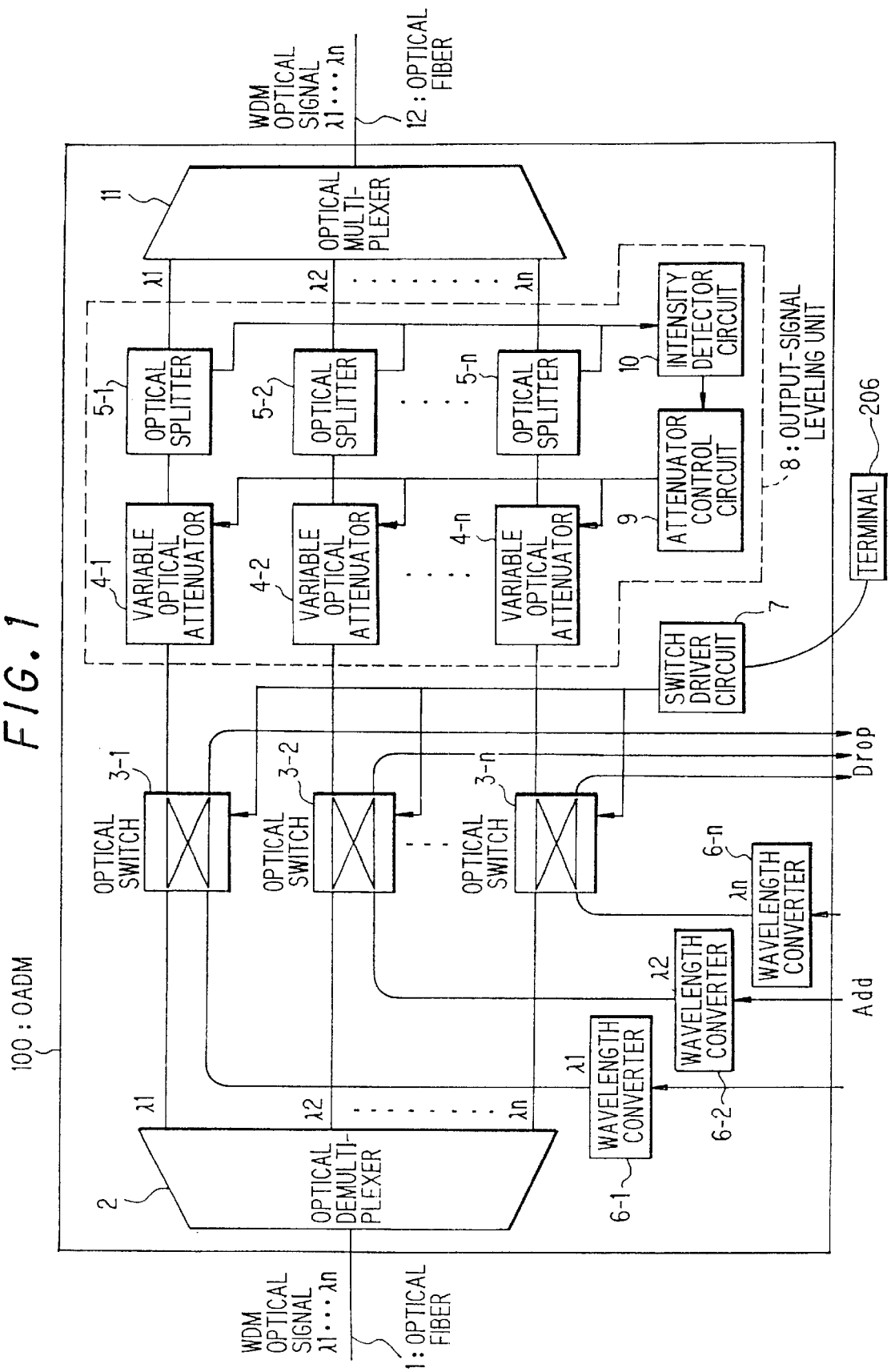
FIG. 1 is a block diagram illustrating an OADM according to an embodiment of the invention.

FIG. 1 is a block diagram illustrating an OADM according to an embodiment of the invention.

Referring to FIG. 1, the OADM comprises; an optical demultiplexer 2, n optical switches 3-1, 3-2, . . . , 3-n, n variable optical attenuators 4-1, 4-2, . . . , 4-n, n optical splitters 5-1, 5-2, . . . , 5-n, n wavelength converters 6-1, 6-2, . . . , 6-n, a switch driver circuit 7, an attenuator control circuit 9, an intensity detector circuit 10, and an optical multiplexer 11.

The optical demultiplexer 2 separates WDM optical signals inputted through an optical fiber 1 and having wavelengths $\lambda_1, \lambda_2, \ldots, \lambda_n$ (n being a positive integer) into n optical signals each having distinct one of the wavelengths $\lambda_1, \lambda_2, \ldots, \lambda_n$.

An optical switch 3-i (i being any positive integer not more than n), for example, of the n optical switches is a two way switch having a first and a second input port and a first and a second output port. To the first input port of the optical switch 3-i, i-th of the n optical signals having a wavelength $\lambda_i$ outputted from the optical demultiplexer 2 is connected, and an i-th add signal supplied from a SONET, for example, is connected to the second input port after its wavelength is converted into $\lambda_i$ through respective one (6-i) of the n wavelength converters.

The first output port of the i-th optical switch 3-i is connected to respective one (4-i) of the n variable optical attenuators, and output of the second output port is supplied to the SONET, for example, as an i-th drop signal.

When the optical switch 3-i is driven in a through mode by the switch driver circuit 7, the first input port is connected to the first output port, while the first input port is connected to the second output port and the second input port is connected to the first output port when the optical switch 3-i is driven in can add/drop mode.

A certain percentage of an optical signal outputted from each of the n variable optical attenuators 4-1, 4-2, . . . , 4-n is split by respective one of the n optical splitters 5-1, 5-2, . . . , 5-n and supplied to the intensity detector circuit 10. Optical intensity of each of the n optical signals detected by the intensity detector circuit 10 is supplied to the attenuator control circuit 9 and compared with respective one of reference voltages which are determined in consideration of coupling coefficients of the n optical signals to be multiplexed in the optical multiplexer 11.

The attenuator control circuit 9 performs feedback control of the attenuation coefficient of each of the n variable optical attenuators 4-1, 4-2, . . . , 4-n so that optical intensity of all the n optical signals detected by the intensity detector circuit 10 correspond to the reference voltages, respectively.

Thus, the n variable optical attenuators 4-1, 4-2, . . . , 4-n, the n optical splitters 5-1, 5-2, . . . , 5-n, the attenuator control circuit 9 and the intensity detector circuit 10 function as an output-signal leveling unit 8 for automatic-controlling optical intensity of the n optical signals so as to leveling optical intensity of every wavelength component of WDM optical signals obtained by multiplexing the n optical signals.

The n optical signals passing through the n optical splitters 5-1, 5-2, . . . , 5-n are multiplexed again by the optical multiplexer 11 into the WDM optical signals to be transmitted through all optical fiber 12.

The OADM of FIG. 1 has a configuration as above described. Therefore, any wavelength components of the WDM optical signals can be dropped and added by driving respective certain of the n optical switches 3-1, 3-2, . . . , 3-n in the add/drop mode by controlling the switch driver circuit 7 through a terminal 206, for example, and optical intensity of every wavelength component of the WDM optical signals can be leveled automatically at an appropriate level.

In the embodiment of FIG. 1, an optical switch is described to be provided for every wavelength component of the WDM optical signals. However, some of the wavelength components demultiplexed by the demultiplexer 2 may be connected directly to the output-signal leveling unit 8 for reducing the number of the optical switches to be inserted between the demultiplexer 2 and the output-signal leveling unit 8, when it is not necessary to add or drop every wavelength component.

Figure 2:
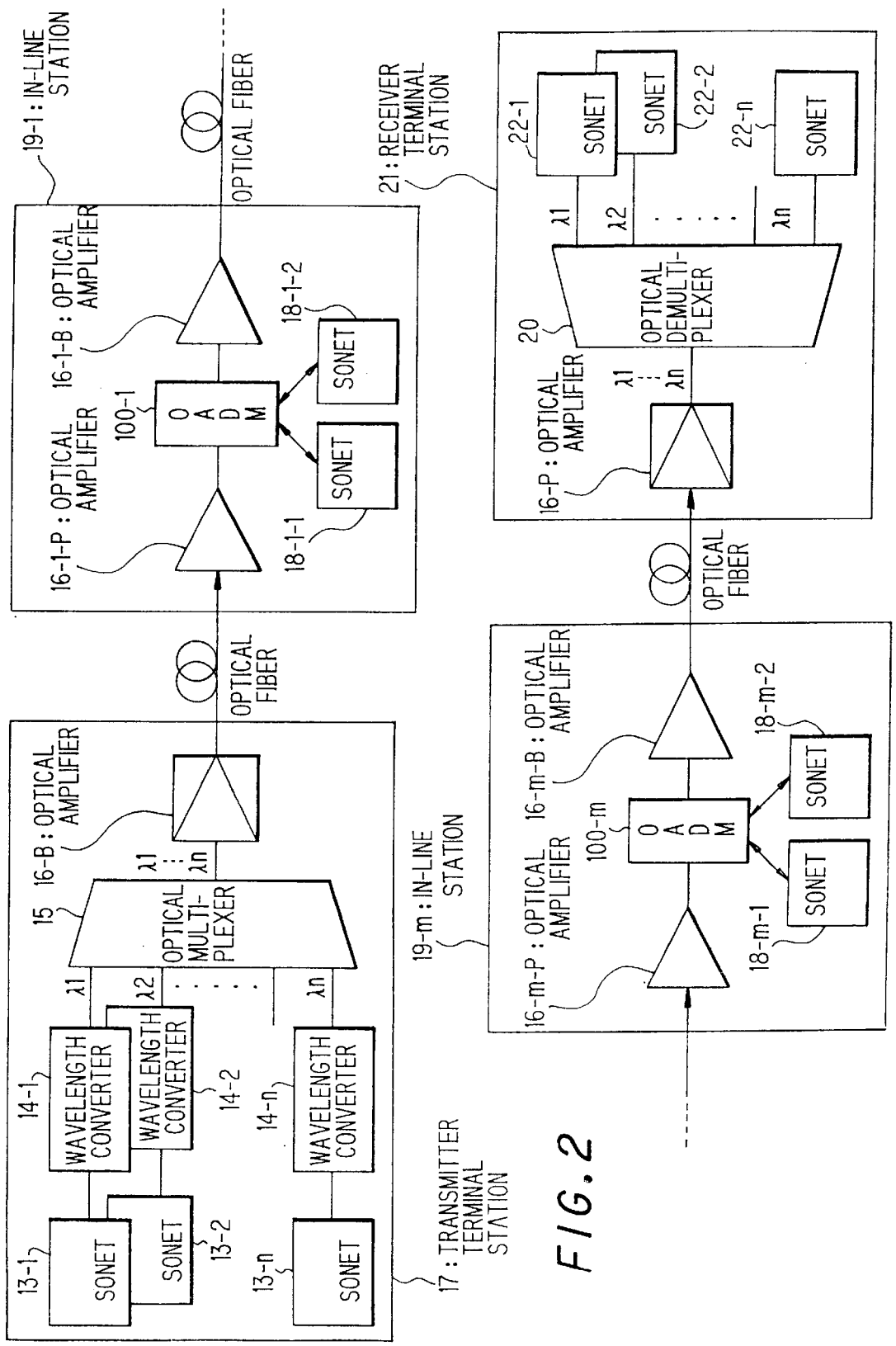
FIG. 2 is a schematic diagram illustrating a configuration example of an NB-WDM optical communication system organized making use of the OADM according to the invention.

FIG. 2 is a schematic diagram illustrating a configuration example of an NB-WDM optical communication system organized making use of the OADM according to the invention as an in-line station thereof, to be used as a trunk network for connecting SONETs 13-1 to 13-n, 18-1-1/2 to 18-m-1/2 and 22-1 to 22-n.

At a transmitter terminal station 17, optical signals from the SONETs 13-1 to 13-n are converted by wavelength converters 14-1 to 14-n into optical signals having different wavelengths $\lambda_1, \lambda_2, \ldots, \lambda_n$ and appropriate optical intensity, respectively, and multiplexed by an optical multiplexer 15 into WDM optical signals, which are amplified by an optical amplifier 16-B to be transmitted towards an in-line station 19-1 through an optical fiber.

In the in-line station 19-1, the WDM optical signals transmitted from the transmitter terminal station 17 are amplified by an optical amplifier 16-1-P, such as an EDFA (Erbium-Doped optical-Fiber Amplifier), and supplied to an OADM 100-1 having such a configuration as described in connection with FIG. 1 and connected to SONETs 18-1-1 and 18-1-2, for example. The WDM optical signals outputted from the OADM 100-1 are amplified by an optical amplifier 16-1-B and transmitted towards next in-line station. In the same way, the WDM optical signals are relayed by way of in-line stations 19-2 to 19-m and received by a receiver terminal station 21.

At the receiver terminal station 21, the WDM optical signals are amplified by an optical amplifier 16-P and demultiplexed by an optical demultiplexer 20 into n optical signals having wavelengths $\lambda_1, \lambda_2, \ldots, \lambda_n$, to be supplied to SONETs 22-1 to 22-n, respectively.

Therefore, any desired wavelength components can be dropped and added at any in-line station. For example, by dropping and adding wavelength components $\lambda_i$ and $\lambda_j$ at the in-line station 19-1 and wavelength components $\lambda_i$ and $\lambda_k$ at the in-line-station 19-m, the wavelength component $\lambda_i$ can be used for transmitting optical signals from the SONET 13-i to the SONET 18-1-1, from the SONET 18-1-2 to a SONET 18-m-1 connected to the in-line station 19-m and from the SONET 18-m-i to the SONET 22-i, the wavelength component $\lambda_j$ being assigned to optical signals from the SONET 13-j to the SONET 18-1-2 and from the SONET 18-1-1 to the SONET 22-j, and the wavelength component $\lambda_k$ being assigned optical signals from the SONET 13-k to a SONET 18-m-2 connected to the in-line station 19-m and from the SONET 18-m-2 to the SONET 22-k.

Thus, a supple assignment of wavelength components is enabled in the NB-WDM optical communication system of FIG. 2.

Figure 3:
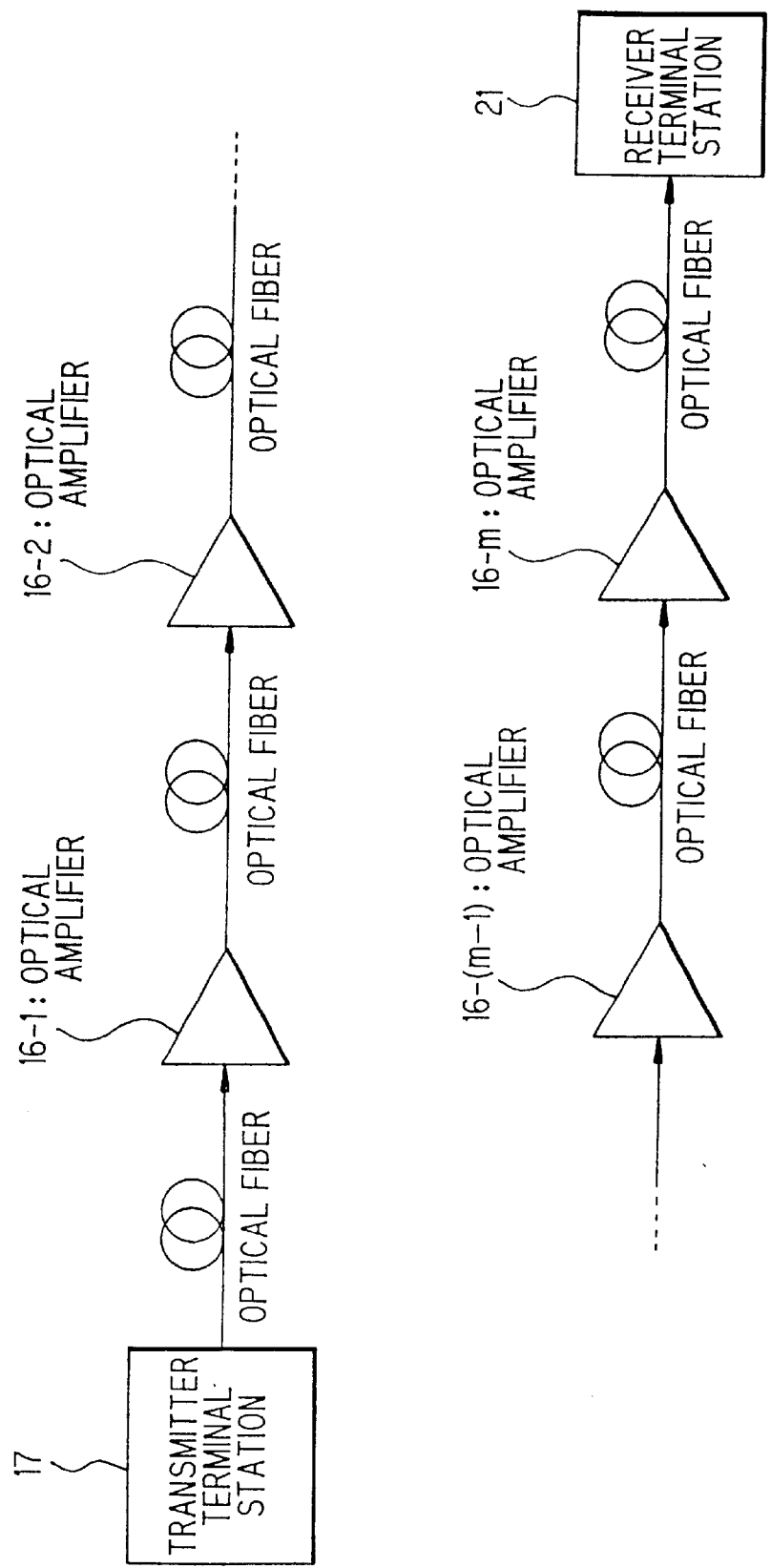
FIG. 3 illustrates a configuration example of a conventional point-to-point NB-WDM optical communication system.

Some of the in-line stations between the transmitter terminal station 17 and the receiver terminal station 21 may be composed of simple optical amplifiers such as described in connection with FIG. 3, or the NB-WDM optical communication system may have a ring form, by connecting the output of the last in-line station 19-m to the input of the first in-line station 19-1, for example.

What is claimed is:

1. An OADM (Optical Add-Drop Multiplexer) of WDM (Wavelength Division Multiplex) optical signals having a plurality of wavelength components, the OADM comprising:

an optical demultiplexer for demultiplexing the WDM optical signals inputted to the optical demultiplexer into individual optical signals, each of the individual optical signals having a respective one of the wavelength components of said WDM optical signals and being outputted to a respective one of optical paths;

an output-signal leveling unit for automatic feedback control of an optical intensity of said individual optical signals inputted through the respective optical paths;

at least one optical switch inserted in selected optical paths, the optical switch dropping a first optical signal inputted from the optical demultiplexer and connecting a second optical signal to the output-signal leveling unit when operated in an add/drop mode, and passing the first optical signal to the output-signal leveling unit when operated in a through mode; and an optical multiplexer for multiplexing the individual optical signals outputted from the output-signal leveling unit into the WDM optical signals to be outputted.

2. An OADM as recited in claim 1, wherein the optical switch is provided in each of the respective optical paths.

3. An OADM as recited in claim 1, wherein:

the optical switch has a first input port connected to the first optical signal, a second input port connected to the second optical signal supplied through a wavelength converter from outside, a first output port connected to the output-signal leveling unit, and a second output port connected to outside; and a switch driver circuit is provided for driving the optical switch either in the through mode or in the add/drop mode, the first input port being connected to the first output port in the through mode, and the first input port being connected to the second output port and the second input port being connected to the first output port in the add/drop mode.

4. A NB-WDM (Narrow Band Wavelength Division Multiplex) optical communication system having an in-line station, the in-line station comprising:

an OADM (Optical Add-Drop Multiplexer) including:

an optical demultiplexer for demultiplexing WDM optical signals inputted to the optical demultiplexer into individual optical signals, each of the individual optical signals having a respective one of the wavelength components of said WDM optical signals and being outputted to a respective one of optical paths, an output-signal leveling unit for automatic feedback control of an optical intensity of said individual optical signals inputted through the respective optical paths, at least one optical switch inserted in selected optical paths, the optical switch dropping a first optical signal inputted from the optical demultiplexer and connecting a second optical signal to the output-signal leveling unit when operated in an add/drop mode, and passing the first optical signal to the output-signal leveling unit when operated in a through mode, and an optical multiplexer for multiplexing the individual optical signals outputted from the output-signal leveling unit into the WDM optical signals to be outputted;

an input optical amplifier for amplifying the WDM optical signals to be supplied to the OADM; and an output optical amplifier for amplifying the WDM optical signals outputted from the OADM.

5. An NB-WDM optical communication system as recited in claim 4, wherein the input optical amplifier and the output optical amplifier is an EDFA (Erbium-Doped optical-Fiber Amplifier).

6. An OADM (Optical Add-Drop Multiplexer) of WDM (Wavelength Division Multiplex) optical signals having a plurality of wavelength components, the OADM comprising:

an optical demultiplexer for demultiplexing the WDM optical signals inputted to the optical demultiplexer into individual optical signals, each of the individual optical signals having a respective one of the wavelength components of said WDM optical signals and being outputted to a respective one of optical paths;

an output-signal leveling unit for automatic feedback control of an optical intensity of said individual optical signals inputted through the respective optical paths;

at least one optical switch inserted in selected optical paths, the optical switch dropping a first optical signal inputted from the optical demultiplexer and connecting a second optical signal to the output-signal leveling unit when operated in an add/drop mode, and passing the first optical signal to the output-signal leveling unit when operated in a through mode; and an optical multiplexer for multiplexing the individual optical signals outputted from the output-signal leveling unit into the WDM optical signals to be outputted;

wherein the output-signal leveling unit further comprises:

variable optical attenuators provided for each of the respective optical paths and attenuating an optical signal inputted from the respective optical paths;

optical splitters provided for each of the respective variable optical attenuators and splittings a certain percentage of the optical signal attenuated by respective one of the variable optical attenuators;

an intensity detector circuit for detecting an optical intensity of optical signals split from the optical splitters; and an attenuator control circuit for controlling the optical intensity of each of the optical signals split from the optical splitters to correspond to respective one of predetermined reference voltages by performing feedback control of attenuation coefficients of the variable optical attenuators referencing the optical intensity detected by the intensity detector circuit.

* * * * *